US008178475B2

(12) United States Patent
Ballard

(10) Patent No.: US 8,178,475 B2
(45) Date of Patent: *May 15, 2012

(54) SURFACTANT MATERIALS AND COATINGS FOR WEIGHTING AGENTS FOR USE IN OIL BASED DRILLING FLUIDS

(75) Inventor: David Antony Ballard, Aberdeenshire (GB)

(73) Assignee: M-I L.L.C, Houston, TX (US)

( * ) Notice: Subject to any disclaimer, the term of this patent is extended or adjusted under 35 U.S.C. 154(b) by 1115 days.

This patent is subject to a terminal disclaimer.

(21) Appl. No.: 11/760,486

(22) Filed: Jun. 8, 2007

(65) Prior Publication Data

US 2007/0298976 A1 Dec. 27, 2007

Related U.S. Application Data

(60) Provisional application No. 60/804,352, filed on Jun. 9, 2006.

(51) Int. Cl.
*C09K 8/32* (2006.01)

(52) U.S. Cl. ........ 507/265; 507/129; 507/136; 507/137; 507/204; 507/209; 507/261; 507/263

(58) Field of Classification Search .................. None
See application file for complete search history.

(56) References Cited

U.S. PATENT DOCUMENTS

| | | | | |
|---|---|---|---|---|
| 2,654,443 | A | | 10/1953 | Piety |
| 3,148,199 | A | * | 9/1964 | De Groote et al. ............. 554/51 |
| 3,250,330 | A | * | 5/1966 | Smith, Jr. ....................... 166/295 |
| 4,042,478 | A | * | 8/1977 | Hazan et al. .................... 204/493 |
| 4,425,462 | A | | 1/1984 | Turner et al. |
| 4,442,241 | A | | 4/1984 | Drake et al. |
| 4,568,709 | A | * | 2/1986 | Paar et al. ...................... 523/414 |
| 4,786,666 | A | * | 11/1988 | Cecil et al. .................... 523/427 |
| 5,128,390 | A | | 7/1992 | Murphey et al. |
| 5,227,453 | A | * | 7/1993 | Elmore et al. ................. 528/104 |
| 5,945,386 | A | | 8/1999 | Alonso-DeBolt et al. |
| 6,194,490 | B1 | | 2/2001 | Roth et al. |
| 6,548,189 | B1 | * | 4/2003 | Gunasekaran et al. ....... 428/626 |
| 6,790,811 | B2 | | 9/2004 | Patel |
| 2004/0033905 | A1 | * | 2/2004 | Shinbach et al. ............. 507/100 |
| 2004/0050752 | A1 | * | 3/2004 | Leinweber et al. ...... 208/48 AA |
| 2005/0020735 | A1 | | 1/2005 | Krappe et al. |
| 2005/0288456 | A1 | | 12/2005 | Morkunas et al. |
| 2006/0237372 | A1 | * | 10/2006 | Arciszewski et al. ......... 210/708 |

FOREIGN PATENT DOCUMENTS

WO 02/053676 A1 7/2002

OTHER PUBLICATIONS

PCT International Search Report issued in Application No. PCT/US2007/070849 dated Sep. 27, 2007 (3 pages).
PCT Written Opinion issued in Application No. PCT/US2007/070849 dated Sep. 27, 2007 (6 pages).
Office Acton issued in Canadian Appliation No. 2,654,639 dated Jun. 2, 1010 (3 pages).
Supplementary European Search Report issued in European Applicaton No. 07784382.9 dated Jun. 16, 2010 (7 pages).
Examination Report issued in related Australian Applicaiton No. 2007256601 dated Apr. 22, 2010 (2 pages).
Office Action issued in related Eurasian Patent Application No. 200870602; dated Apr. 18, 2010; (4 pages).
Office Action issued in corresponding Eurasian Application No. 200870602 dated Mar. 3, 2011 (6 pages).
Office Action issued in the corresponding Australian Application No. 2007256601 dated May 16, 2011 (2 pages).
Office Action issued in corresponding Australian Application No. 2077256601 dated Nov. 15, 2011 (2 pages).
Office Action issued in corresponding European Application No. 07784382.9 dated Dec. 1, 2011 (5 pages).
Office Action issued in corresponding Argentine Application No. P 07 01 02542 dated Nov. 4, 2011 (8 pages).
Office Action issued in correponsding Eurasian Application No. 200870602 dated Jan. 30, 2012 (4 pages).

* cited by examiner

*Primary Examiner* — John J Figueroa
(74) *Attorney, Agent, or Firm* — Osha • Liang LLP

(57) ABSTRACT

A wellbore fluid that includes an oleaginous continuous phase; a non-oleaginous phase; and a polymeric additive formed by mixing at least one lipophilic monomer and at least one crosslinking agent, wherein the at least one lipophilic monomer is at least one of an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and synthetic aliphatic or aromatic ethers, and the at least one crosslinking agent includes at least one selected from amines, alcohols, phenols, thiols, carbanions, carboxylates, and mixtures thereof is disclosed.

14 Claims, No Drawings

SURFACTANT MATERIALS AND COATINGS FOR WEIGHTING AGENTS FOR USE IN OIL BASED DRILLING FLUIDS

CROSS-REFERENCE TO RELATED APPLICATIONS

This application claims priority under 35 U.S.C. §119(e) to U.S. Provisional Patent Application No. 60/804,352, filed Jun. 9, 2006, the disclosure of which is incorporated herein by reference.

BACKGROUND OF INVENTION

1. Field of the Invention

Embodiments disclosed herein relate generally to polymers as surfactants and as coatings for weighting agents used in wellbore fluids.

2. Background Art

When drilling or completing wells in earth formations, various fluids are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Many types of fluids have been used in well bores particularly in connection with the drilling of oil and gas wells. The selection of an oil-based wellbore fluid involves a careful balance of the both the good and bad characteristics of such fluids in a particular application. The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art. An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil-based mud can be justified.

Despite the many benefits of using oil-based muds, they have disadvantages. In general, the use of oil-based drilling fluids and muds has high initial and operational costs. These costs can be significant depending on the depth of the hole to be drilled. However, often the higher costs can be justified if the oil-based drilling fluid prevents the caving in or hole enlargement which can greatly increase drilling time and costs.

In general, drilling fluids should be pumpable under pressure down through strings of the drilling pipe, then through and around the drilling bit head deep in the earth, and then returned back to the earth surface through an annulus between the outside of the drill stem and the hole wall or casing. Beyond providing drilling lubrication and efficiency, and retarding wear, drilling fluids should suspend and transport solid particles to the surface for screening out and disposal. In addition, the fluids should be capable of suspending additive weighting agents (to increase specific gravity of the mud), generally finely ground barites (barium sulfate ore), and transport clay and other substances capable of adhering to and coating the borehole surface.

Drilling fluids are generally characterized as thixotropic fluid systems. That is, they exhibit low viscosity when sheared, such as when in circulation (as occurs during pumping or contact with the moving drilling bit). However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be removed or otherwise settle out from the liquid fraction.

There is an increasing need for drilling fluids having the Theological profiles that enable these wells to be drilled more easily. Drilling fluids having tailored Theological properties ensure that cuttings are removed from the wellbore as efficiently and effectively as possible to avoid the formation of cuttings beds in the well which can cause the drill string to become stuck, among other issues. There is also the need from a drilling fluid hydraulics perspective (equivalent circulating density) to reduce the pressures required to circulate the fluid, this helps to avoid exposing the formation to excessive forces that can fracture the formation causing the fluid, and possibly the well, to be lost. In addition, an enhanced profile is necessary to prevent settlement or sag of the weighting agent in the fluid, if this occurs it can lead to an uneven density profile within the circulating fluid system which can result in well control (gas/fluid influx) and wellbore stability problems (caving/fractures).

To obtain the fluid characteristics required to meet these challenges the fluid must be easy to pump, so it requires the minimum amount of pressure to force it through restrictions in the circulating fluid system, such as bit nozzles or downhole tools. Or in other words the fluid must have the lowest possible viscosity under high shear conditions. Conversely, in zones of the well where the area for fluid flow is large and the velocity of the fluid is slow or where there are low shear conditions, the viscosity of the fluid needs to be as high as possible in order to suspend and transport the drilled cuttings. This also applies to the periods when the fluid is left static in the hole, where both cuttings and weighting materials need to be kept suspended to prevent settlement. However, it should also be noted that the viscosity of the fluid should not continue to increase under static conditions to unacceptable levels otherwise when the fluid needs to be circulated again this can lead to excessive pressures that can fracture the formation or alternatively it can lead to lost time if the force required to regain a fully circulating fluid system is beyond the limits of the pumps.

Basic invert emulsion fluid chemistry has not radically changed since its introduction; the same basic types of surfactants (amido-amines) and viscosifiers (organoclays) are still used with their associated issues. For example, the strongly wetting nature of amido-amine can cause the system to become over-dispersed, which results in a loss of viscosity.

The materials that affect the Theological profile of oil-based muds may include both surfactants and weighting agents. Accordingly, there exists a continuing need for improving these drilling materials and wellbore fluid formulations.

SUMMARY OF INVENTION

In one aspect, embodiments disclosed herein relate to a wellbore fluid that includes an oleaginous continuous phase; a non-oleaginous phase; and a polymeric additive formed by mixing at least one lipophilic monomer and at least one crosslinking agent, wherein the at least one lipophilic monomer is at least one of an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and a long-chain alkyl ether, and the at least one crosslinking agent includes at least one selected from amines, alcohols, phenols, thiols, carbanions, carboxylates, and mixtures thereof.

In another aspect, embodiments disclosed herein relate to a method of formulating an invert emulsion drilling fluid that includes mixing an oleaginous fluid, a non-oleaginous fluid, and a polymeric additive; wherein the polymeric additive is present in an amount sufficient to form an invert emulsion in which the oleaginous fluid is the continuous phase and the non-oleaginous fluid is the discontinuous phase; and wherein the polymeric additive comprises a polymer formed by mixing at least one lipophilic monomer and at least one crosslinking agent; wherein the at least one lipophilic monomer is an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and long-chain alkyl ether; and wherein the at least one crosslinking agent comprises at least one selected from amines, alcohols, phenols, thiols, carbanions, carboxylates, and mixtures thereof.

In yet another aspect, embodiments disclosed herein relate to a method of drilling a subterranean hole with an invert emulsion drilling fluid that includes mixing an oleaginous fluid, a non-oleaginous fluid, and a polymeric additive to form an invert emulsion; wherein the polymeric additive is present in an amount sufficient to form an invert emulsion in which the oleaginous fluid is the continuous phase and the non-oleaginous fluid is the discontinuous phase; and wherein the polymeric additive comprises a polymer formed by mixing at least one lipophilic monomer and at least one crosslinking agent; wherein the at least one lipophilic monomer is an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and long-chain alkyl ether; and wherein the at least one crosslinking agent comprises at least one selected from amines, alcohols, phenols, thiols, carbanions, carboxylates, and mixtures thereof; and drilling the subterranean with the invert emulsion as the drilling fluid.

In yet another aspect, embodiments disclosed herein relate to a weighting agent that includes a powdered solid; and a polymeric additive coating the powdered solid; wherein the polymeric additive comprises a polymer formed by mixing at least one lipophilic monomer and at least one crosslinking agent; wherein the at least one lipophilic monomer is an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and long-chain alkyl ether; and wherein the at least one crosslinking agent comprises at least one selected from amines, alcohols, phenols, thiols, carbanions, carboxylates, and mixtures thereof.

Other aspects and advantages of the invention will be apparent from the following description and the appended claims.

DETAILED DESCRIPTION

In one aspect, embodiments disclosed herein relate to polymeric surface active agents (surfactants) and coatings for weighting agents, both of which may be incorporated into wellbore fluid formulations. In another aspect, embodiments disclosed herein relate to polymers synthesized via nucleophilic epoxide-opening of epoxidized derivatives of natural oils. In the following description, numerous details are set forth to provide an understanding of the present disclosure. However, it will be understood by those skilled in the art that the present disclosure may be practiced without these details and that numerous variations or modifications from the described embodiments may be possible.

In one embodiment, the polymeric materials disclosed herein may be formulated from a lipophilic monomer unit and a crosslinking agent using epoxy-amine chemistry. Epoxy-amine based chemistry for polymer synthesis has been disclosed in U.S. Patent Publications 2005/0020735 and 2005/0288456 and U.S. Pat. No. 6,194,490, which are incorporated by reference.

Lipophilic Monomer

In one embodiment, the polymeric material may be formed from a lipophilic monomer which is capable of being chemically crosslinked to form a polymeric structure. In a particular embodiment, suitable lipophilic monomers may comprise various epoxidized natural oils such as soybean oil, linseed oil, rapeseed oil, cashew nut shell oil, perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, and tall oil, or epoxidized synthetic lipophilic monomers. In another embodiment, the lipophilic monomer may comprise various synthetic epoxide derivatives of long-chain aliphatic or aromatic ethers. Such structures may comprise C6-C15 aliphatic or aromatic glycidyl ethers such those with trade names EPODIL® 747 and EPODIL® 748, available from Air Products (Allentown, Pa.), and HELOXY™ available from Hexion Specialty Chemicals (Houston, Tex.).

A lipophilic monomer containing an epoxide group may serve as the reactive electrophilic group for crosslinking with an appropriate nucleophile according to the general chemical reaction:

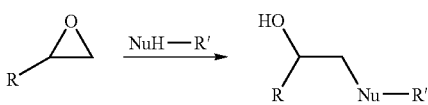

wherein R represents a lipophilic group and may comprise a plurality of epoxide groups for crosslinking, and R'NuH represents a crosslinking agent and may comprise a plurality of heteroatom nucleophiles.

In a particular embodiment, the lipophlic monomer may comprise epoxide-containing derivatives of cardanol, which is represented by the following structure:

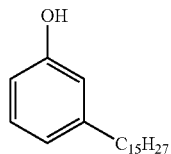

Cardanol is a meta substituted alkenyl phenol derived from naturally occurring phenols extracted from cashew nut shell liquid, derivatives of which are available from several commercial sources including Cardolite Corporation (Newark, N.J.). Due to the mixed aliphatic/aromatic structure of cardanol, its derivatives are compatible with a wide array of organic solvents, including OBM. The aliphatic side chain contains a single unsaturation which may be epoxidized and thus provides a point for possible crosslinking. Cardanol also possesses many chemical characteristics of phenols, namely reactive ortho and para positions for electrophilic aromatic substitution. Such reactivity patterns are the basis of the synthesis of commercially available derivatives such as formaldehyde condensation oligomers (novolac or novolak resins as known by those skilled in the art) such with the general structure:

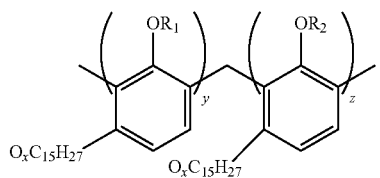

wherein X is 0 or 1 and represents whether or not the aliphatic side chain is epoxidized, y and z represent repeating cardanol units that may have differing functional groups on the aromatic phenol group ($R_1$ and $R_2$). The total number of cardanol units in the oligomer is represented by the sum of y and z and may vary from 1 to 30 in one embodiment, from 1 to 10 in another embodiment, and from 1 to 5 in yet another embodiment. The side chain phenolic groups, $R_1$ and $R_2$, may be independently hydrogen, alkyl or an alkenyl epoxide side chain comprising from 2 to 15 carbons. Alkyl and alkenyl epoxides may comprise straight carbon chains, branched carbon chains, or combinations thereof. Additionally, one skilled in the art would recognize that both alkyl and alkenyl carbon chains may be substituted and may comprise derivatives with at least one of halogen, alkoxy, aryl, and heteroaryl substituents, for example, each of which may be also be substituted. Furthermore, one skilled in the art would also recognize that, as used herein, "substituted" refers to the replacement of hydrogens) on the alkyl or alkenyl chain (or any of its substituents) with any other atom or group of atoms including isotopes such as deuterium or tritium.

In one embodiment, the aliphatic side chain may maintain its unsaturation (x=0) or it may be epoxidized (x=1). In the novolac type resins, formaldehyde may serve to connect the cardanol units with methylene ($CH_2$) bridges. Oligomers of cardanol may comprise 2-30 cardanol units (y+z) in one embodiment. The phenolic group of cardanol may be further functionalized, and the formaldehyde oligomer products may incorporate phenols with differing substitution on the phenol ($R_1$ and $R_2$). Although, in this embodiment, two different phenolic substitutions are shown, one of ordinary skill in the art would appreciate that more than two different phenolic substitutions may be incorporated into an oligomer.

In one embodiment, an epoxide may be present in the phenolic substituents $R_1$ and $R_2$. This may be the epoxide of a straight alkenyl chain which may comprise vinyl, propenyl, butenyl, pentenyl, hexenyl, heptenyl, octenyl, nonenyl, decenyl, undecenyl, and dodecenyl side chains. In a particular embodiment the side chain may be the epoxide of a propenyl side chain (a glycidyl ether). While specific embodiments refer to normal straight chain alkenyl side chains, one of ordinary skill in the art would appreciate that epoxides of branched chain alkenyl substitutions on the phenol group may also be possible.

In one embodiment, the lipophilic monomer may have the structure represented by x=0, y=0, z=1 and $R_1$=glycidyl ether. In such a case the nucleophilic crosslinking partner may require more than one functional amine nucleophile. In another embodiment, the lipophilic monomer may have the structure represented by x=1, y=0, z=1 and $R_1$=glycidyl ether. In yet another embodiment, the lipophilic monomer may have the structure represented by x=0, y+z=5, $R_1$=glycidyl ethers of the phenol of cardanols in positions 1, 3 and 5 of the oligomer and $R_2$=hydrogen on the phenol of cardanols in positions 2 and 4 of the oligomer.

In another embodiment, the lipophilic monomer may be a cardanol derivative with a functionalized aliphatic side chain as represented by the following structure:

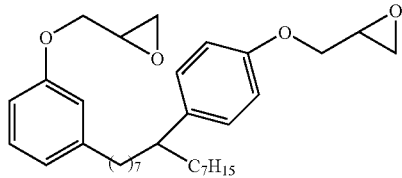

With respect to applications in oil drilling, a lipophilic monomer may be desirable when used in conjunction with an oil-based mud (OBM). The lipophilic character may lend solubility to the resultant polymer structure in the OBM. One skilled in the art would recognize that, the appropriate choice of lipophilic monomer will depend on the desired properties of the end product polymer. Traits of the polymer that may be of interest include flexibility, rigidity, chemical resistance, heat resistance, impact resistance and ability to create an invert emulsion.

Crosslinking Agent

In one embodiment, the polymeric material also comprises at least one crosslinking agent in order to effect polymerization of the lipophilic monomer. In general, the crosslinking agent may be any nucleophilic group that may react to open an epoxide. In a further embodiment, the crosslinking agent may comprise a polyfunctional molecule with more than one nucleophilic group. In particular embodiments, the nucleophilic groups may comprise amines, alcohols, phenols, thiols, carbanions, and carboxylates.

In one embodiment, the crosslinking agent may be an aliphatic polyamine such as ethylenediamine (EDA), diethylenetriame (DTA), and triethylenetetramine (TETA), which comprise a short, linear chain between amine groups. Crosslinking with such agents tends to create highly crosslinked layers with good resistance to heat and chemicals, including solvents. In another embodiment the aliphatic amine may be a polyethylenimine (PEI) which are ethylenediamine polymers and are commercially available under the trade name LUPASOL® from BASF (Germany). PEIs may vary in degree of branching and therefore may vary in degree of crosslinking. LUPASOL® PEIs may be small molecular weight constructs such as LUPASOL® FG with an average molecular weight of 800 or large molecular weight constructs such as LUPASOL® SK with average molecular weight of 2,000,000.

In yet another embodiment the aliphatic amine may be a polyetheramine such as those commercially available under the trade name JEFFAMINE® Huntsman Performance Products (Woodlands, Tex.). For example, useful JEFFAMINE® products may include triamines JEFFAMINE® T-5000 and JEFFAMINE® T-3000 or diamines such as JEFFAMINE® D-400 and JEFFAMINE® D-2000. Useful polyetheramines may possess a repeating polyether backbone and may vary in molecular weight from about 200 to about 5000 g/mol. Crosslinking with these constructs may lead to products with excellent flexibility and impact resistance.

In one embodiment, the crosslinking agent may include modified cycloaliphatic amines derived from 3-aminomethyl-3,5,5-trimethyl cyclohexyl amine (IPDA). They produce crosslinked products with a fast cure rate, and are suitable for low temperature operations. Crosslinked products comprising IPDA derivatives provide very good resistance to chemicals, common solvents and water.

In one embodiment, the crosslinking agent may be an aromatic amine. The amine groups are separated by rigid benzene rings rather than flexible chains of molecules as in the aliphatic amines. Polymers produced with aromatic amines may possess good physical properties like impact resistance as well as high resistance to heat and chemicals, particularly when they are formulated with epoxy novolac-type resins. Such crosslinked products may also exhibit high temperature resistance and may possess good water resistance. Aromatic amines may comprise such commercial products as the phenalkamines available from Cardolite Corporation (Newark, N.J.) and may include Lite-2002, NC-558, NC-540, NC-541, NC-546, NC-549 and NC-550.

One skilled in the art would recognize that the degree of crosslinking may effect the properties of the resultant polymer. One of skill in the art should appreciate that the molar equivalent ratio of the lipophilic monomer to the selected cross-linking agent (LM:CLA) will affect the extent of crosslinking achieved. Through routine variation of the molar equivalent ratio LM:CLA, one of skill in the art should be easily able to determine the proper molar equivalent ratio to obtain a desired viscosity. Further, one of skill in the art should appreciate that a minimally crosslinked polymer with high fluidity (i.e., low viscosity) will be achieved using a high LM:CLA molar equivalent ratio. In one embodiment, the ratio should be selected so that only partial polymerization occurs. The resultant materials may be viscous liquids suitable as surfactant agents. In another embodiment, the ratio may be selected for high crosslinking and may lead to harder structures that may be appropriate as a coating for weighting agents.

Polymeric Material

The ratio of lipophilic monomer to crosslinking agent (LM:CLA) may vary. In one embodiment the ratio may be 1:1 by weight. In another embodiment, the ratio may be 3:1 by weight lipophilic monomer to crosslinking agent. In yet another embodiment, the ratio may be 5:1 by weight lipophilic monomer to crosslinking agent, and 20:1 in still a farther embodiment. In one embodiment, more than one lipophilic monomer may be crosslinked. In another embodiment, more than one crosslinking agent may be used. In yet another embodiment, more than one lipophilic monomer may be crosslinked with more than one crosslinking agent. One of ordinary skill in the art would appreciate that the weight (or molar equivalent) ratio of the lipophilic monomer to the crosslinking agent will effect the extent of crosslinking. Through routine variation of the quantity of the reacting partners, one skilled in the art should easily be able to determine the proper ratio to obtain a desired viscosity. One skilled in the art would also appreciate that a minimally crosslinked polymer will have high fluidity (low viscosity). Through systematic experimentation, one of skill in the art will be able to determine the ideal conditions to achieve a predetermined result, be it a viscous fluid, a gel-like fluid or a solid-, waxy-like material, or solid hard material. It should also be appreciated that for oil-field applications, it is possible to optimize the reaction conditions, such as concentration of reactants, temperature, etc, to produce a polymer with a definable set time.

In one embodiment, the reaction of the lipophilic monomer and the crosslinking agents may be carried out using a suspension polymerization technique. In suspension polymerization, the polymer is prepared in a carrier fluid. Typically, the monomers are soluble in the carrier fluid and are stabilized in the carrier fluid before and during the polymerization by the use of surfactants.

In one embodiment, the mixtures of lipophilic monomer and crosslinking agent may be heated in a dynamic aging process with a kneader to form the polymeric product. In one embodiment, the temperature may range from 30 to 250° C. In another embodiment, the temperature may range from 30 to 175° C. In yet another embodiment, the temperature may range from 50 to 100° C.

In one embodiment, the polymeric material may have a molecular weight ranging from about 300 to about 2,000,000, from about 500 to about 50,000 in another embodiment, and from about 1000 to about 5,000 in yet another embodiment.

Example Surfactant Synthesis

Epoxidized soybean oil (ESO) and LUPASOL® FG are mixed together with a co-crosslinking agent JEFFAMINE® D230 in a weight ratio of 2:1:0.4 respectively. The polymeric material is formed by dynamic aging at 65° C. for approximately 16 hours.

Polymer Additive as a Coating for Powdered Solids

In one embodiment, the crosslinked lipophilic monomer(s) may be used to coated powdered solid materials. Powdered solids that may be coated with the polymeric material disclosed herein include for example, barium sulfate (barite), calcium carbonate, dolomite, ilmenite, hematite, olivine, siderite, strontium sulfate, and combinations thereof, as well as any other suitable materials that should be well known to one of skill in the art. The solid materials may be used, for example, as weighting agents in a wellbore fluid. Conventional weighting agents such as powdered barite are subject to strict quality control parameters established by the American Petroleum Institute (API) and may include particle sizes ranging from 3 to 74 microns. In one embodiment, powdered solids having a particle size from 3 to 74 microns may be coated with the polymeric material disclosed herein. In another embodiment, powdered solids having a particle size of less than 3 microns may be coated with the polymeric material disclosed herein.

The polymeric material that may be used for coating solid materials may be prepared by mixing the reactants together in a stoichiometric ratio so there are sufficient reactive groups present to form a three dimensional solid polymeric structure. Solid materials may be coated with the polymeric material by a process that includes: contacting the powdered solid material with a solution including the lipophilic monomer; and reacting the lipophilic monomer with a crosslinking agent.

Polymer Additive as an Invert Emulsion Component For Wellbore Fluid Formulations In one embodiment, the polymeric material may be included as a surfactant in a wellbore fluid. In another embodiment, the polymeric material may be included as a coating on a weighting agent. The wellbore fluids may include an oleaginous continuous phase, a non-oleaginous discontinuous phase, and the polymeric material formulated as a surfactant or the polymeric material formulated as a coating on a weighting agent.

In one embodiment polymer surfactants described by the procedures above may be included in a wellbore fluid. In another embodiment, the polymer formed as described above may serve as a coating on weighting agent such as barite or calcium carbonate and may be included in a wellbore fluid. The wellbore fluids may include an oleaginous continuous phase, a non-oleaginous discontinuous phase, and a surfactant. One of ordinary skill in the art would appreciate that the polymer formulations described above may be modified in accordance with the desired application. For example, modifications may include the degree of crosslinking, and/or the nature of the crosslinking agent.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof. In a particular embodiment, coated barite or other weighting agents may be included in a wellbore fluid comprising an aqueous fluid that includes at least one of fresh water, sea water, brine, and combinations thereof.

The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

Conventional methods can be used to prepare the drilling fluids disclosed herein in a manner analogous to those normally used, to prepare conventional oil-based drilling fluids. In one embodiment, a desired quantity of oleaginous fluid such as a base oil and a suitable amount of the surfactant described above are mixed together and the remaining components are added sequentially with continuous mixing. An invert emulsion may be formed by vigorously agitating, mixing or shearing the oleaginous fluid and the non-oleaginous fluid.

Other additives that may be included in the wellbore fluids disclosed herein include for example, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Advantages of the current disclosure may include enhanced rheological properties of the fluids that incorporate the surfactants described herein. These properties may include the yield point and the plastic viscosity. Additionally, the incorporation of highly lipophilic monomers in the surfactant synthesis should yield products that are compatible for use with oil-based mud drilling fluids. Such surfactants may increase lubricity and diminish wear of the drilling equipment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:
1. A wellbore fluid comprising:
an oleaginous continuous phase;
a non-oleaginous phase; and
a polymeric additive formed by mixing at least one lipophilic monomer and at least one crosslinking agent;
wherein the at least one lipophilic monomer is at least one selected from an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and synthetic aliphatic or aromatic ethers; and wherein the at least one crosslinking agent comprises at least one selected from amines, alcohols, phenols, thiols, carbanions, carboxylates, and mixtures thereof;

wherein the at least one lipophilic monomer comprises derivatives of the extracts of cashew nut oil comprising structures represented by formulas:

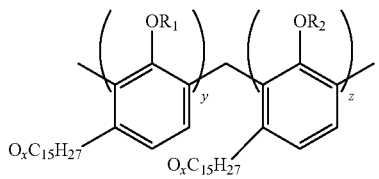

wherein x is an integer selected from 0 to 1;
wherein y is an integer selected from 0 to 5;
wherein z is an integer selected from 1 to 5;
wherein $R_1$ is selected from H, alkyl, alkenyl epoxide, and derivatives thereof; and
wherein $R_2$ is selected from H alkyl, alkenyl epoxide, and derivatives thereof.

2. The wellbore fluid of claim 1, wherein the at least one crosslinking agent comprises at least one selected from aliphatic polyamines, cycloaliphatic polyamines, and aromatic polyamines.

3. The wellbore fluid of claim 2, wherein the aliphatic polyamines comprises at least one selected from ethylenediamine (EDA), diethylenetriamine (DTA), triethylenetetramine (TETA), polyethyleneimines (PEI), and polyetheramines.

4. The wellbore fluid of claim 1, wherein a weight ratio of the lipophilic monomer to the crosslinking agent is a range from about 0.5 to 3.

5. The wellbore fluid of claim 1, wherein the polymeric additive comprises a coating for a weighting agent.

6. A method of formulating an invert emulsion drilling fluid comprising:
mixing an oleaginous fluid, a non-oleaginous fluid, and a polymeric additive;
wherein the polymeric additive is present in an amount sufficient to form an invert emulsion in which the oleaginous fluid is the continuous phase and the non-oleaginous fluid is the discontinuous phase; and
wherein the polymeric additive comprises a polymer formed by mixing at least one lipophilic monomer and at least one crosslinking agent;
wherein the at least one lipophilic monomer is an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and synthetic aliphatic or aromatic ethers; and wherein the at least one crosslinking agent comprises at least one selected from amines, alcohols, phenols, thiols, carbanions, carboxylates, and mixtures thereof;

wherein the at least one lipophilic monomer comprises derivatives of the extracts of cashew nut oil comprising structures represented by formulas:

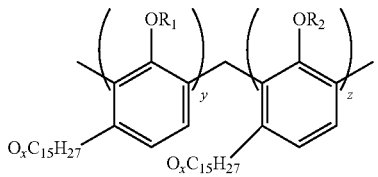

wherein x is an integer selected from 0 to 1;
wherein y is an integer selected from 0 to 5;
wherein z is an integer selected from 1 to 5;
wherein $R_1$ is selected from H, alkyl, alkenyl epoxide, and derivatives thereof; and
wherein $R_2$ is selected from H, alkyl, alkenyl epoxide, and derivatives thereof.

7. The method of claim 6, wherein the at least one crosslinking agent comprises at least one selected from aliphatic polyamines, cycloaliphatic polyamines, and aromatic polyamines.

8. The method of claim 7, wherein the aliphatic polyamines comprises at least one selected from ethylenediamine (EDA), diethylenetriamine (DTA), triethylenetetramine (TETA), polyethyleneimines (PEI), and polyetheramines.

9. The method of claim 6, wherein a weight ratio of the lipophilic monomer to the crosslinking agent is a range from about 0.5 to 3.

10. A method of drilling a subterranean hole with an invert emulsion drilling fluid comprising:
mixing an oleaginous fluid, a non-oleaginous fluid, and a polymeric additive to form an invert emulsion;
wherein the polymeric additive is present in an amount sufficient to form an invert emulsion in which the oleaginous fluid is the continuous phase and the non-oleaginous fluid is the discontinuous phase; and
wherein the polymeric additive comprises a polymer formed by mixing at least one lipophilic monomer and at least one crosslinking agent;
wherein the at least one lipophilic monomer is an epoxide-functionalized derivative of at least one selected from soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil, and synthetic aliphatic or aromatic ethers; and wherein the at least one crosslinking agent comprises at least one selected from amines, alcohols, phenols, thiols, carbanions, carboxylates, and mixtures thereof;

wherein the at least one lipophilic monomer comprises derivatives of the extracts of cashew nut oil comprising structures represented by formulas:

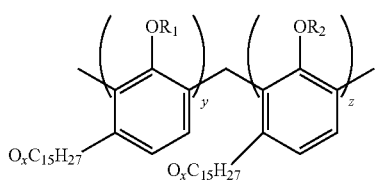

wherein x is an integer selected from 0 to 1;
wherein y is an integer selected from 0 to 5;
wherein z is an integer selected from 1 to 5;
wherein $R_1$ is selected from H, alkyl, alkenyl epoxide, and derivatives thereof; and
wherein $R_2$ is selected from H, alkyl, alkenyl epoxide, and derivatives thereof; and drilling the subterranean with the invert emulsion as the drilling fluid.

11. The method of claim 10, wherein the at least one crosslinking agent comprises at least one selected from aliphatic polyamines, cycloaliphatic polyamines and aromatic polyamines.

12. The method of claim 11, wherein the aliphatic polyamines comprises at least one selected from ethylenediamine (EDA), diethylenetriamine (DTA), triethylenetetramine (TETA), polyethyleneimines (PEI), and polyetheramines.

13. The method of claim 10, wherein a weight ratio of the lipophilic monomer to the crosslinking agent is a range from about 0.5 to 3.

14. The method of claim 10, wherein the polymeric additive is a coating for a weighting agent.

* * * * *